United States Patent [19]

Bremer

[11] 4,038,010

[45] July 26, 1977

[54] APPARATUS FOR PRODUCTION OF GRANULATED AND PULVERIZED PARTICLES FROM PASTY OR SIMILAR MATERIAL

[75] Inventor: Horst Bremer, Lage, Germany

[73] Assignee: Gunther Papenmeier KG Maschinen-und Apparatebau, Detmold, Germany

[21] Appl. No.: 512,871

[22] Filed: Oct. 7, 1974

[30] Foreign Application Priority Data

Oct. 10, 1973 Germany .............................. 2350746

[51] Int. Cl.² .............................................. B29B 1/03
[52] U.S. Cl. .................................... 425/314; 425/331; 425/362
[58] Field of Search ............. 425/314, 331, DIG. 230, 425/362

[56] References Cited

U.S. PATENT DOCUMENTS

| | | | |
|---|---|---|---|
| 2,177,132 | 10/1939 | Crabtree | 425/314 X |
| 2,295,838 | 9/1942 | Glaze | 425/331 X |
| 2,306,145 | 12/1942 | Thompson | 425/331 |
| 2,325,374 | 7/1943 | Cover | 425/331 |
| 2,700,940 | 2/1955 | Johnson | 425/331 X |
| 3,485,186 | 12/1969 | Vincent | 425/314 X |
| 3,892,515 | 7/1975 | Bremer | 425/314 |

FOREIGN PATENT DOCUMENTS

| | | | |
|---|---|---|---|
| 562,186 | 8/1958 | Canada | 425/331 |
| 1,101,374 | 3/1961 | Germany | 425/362 |
| 972,903 | 10/1959 | Germany | |

Primary Examiner—Robert L. Spicer, Jr
Attorney, Agent, or Firm—Strauch, Nolan, Neale, Nies & Kurz

[57] ABSTRACT

Method and various embodiments of apparatus for producing granulates from pulverulent, granular, doughy or similar material. Material to be granulated is continuously fed into the apparatus and formed into a skin of the material in the nip space between two adjacent and cooperating rotating curved surfaces. The skin and material progresses axially of the rotating surfaces and is periodically and repeatedly kneaded as it is conveyed by the rotating surfaces towards and forced through outlet apertures whereupon it is divided up into granulates. The apparatus can be in various embodiments which use paired, skinforming rotating curved surfaces and can be the surfaces of rollers or of at least one roller cooperating with the internal surface of a drum. The rolling surfaces can be cylindrical or combinations which include one or more cylindrical, tapered or axial contoured surfaces. Single or opposed helical lands or grooves can be incorporated in one or both of the paired rotating surfaces.

24 Claims, 7 Drawing Figures

APPARATUS FOR PRODUCTION OF GRANULATED AND PULVERIZED PARTICLES FROM PASTY OR SIMILAR MATERIAL

BACKGROUND OF THE INVENTION

The invention relates to a method and devices for producing granulates from pulverulent, granular, doughy or similar material, more particularly plastics, in which the material to be granulated is formed into a skin between two rotating curved surfaces, for instance, of rollers, the skin form of material being divided into granulates.

Very different types of methods and devices for the manufacture of granulates are known. For instance, German Pat. Specification No. 972,903 discloses an apparatus for granulating pulverulent, pasty or doughy materials, the apparatus including a cylindrical or conical tube formed with sieve-like perforations and utilizing a conveyor or press screw. One or more rotary blades are guided along the sieve surface to divide up the extruded mouldings. The material to be granulated is conveyed by means of a conveyor screw into the granulating apparatus. If suitably constructed, the conveyor screw can precompact the material. By means of a pressure roller formed with corresponding conveying grooves, the material is forced directly, without any definable kneading, through the moulding apertures and then divided into granulates by means of the rotating blades. There is neither the possibility nor the intention of compacting or compressing the material before granulation, for instance, to eliminate any gases which may be enclosed or to make sure that the material is satisfactorily homogenized.

Granulating apparatuses are also known, for instance, from German Auslegeschrift No. 1 242 846, in which the material to be granulated is granulated not immediately after being fed into the apparatus, but only after a suitable compacting phase. However, the phase is much too short, since the material is compacted only at the point of contact of the moulding rollers. The material to be granulated is compacted to some extent, in dependence on its texture, but not adequately homogenized during compacting.

SUMMARY OF THE INVENTION

It is a primary object of the present invention to provide an improved and simplified method for the manufacture of granulates of the kind specified, in which the material to be granulated is satisfactorily compacted and homogenized to the greatest possible extent before being divided into granulates. To this end, according to the invention, the material is continuously fed to an arrangement of cooperating rollers and is periodically and repeatedly kneaded in the axial direction of the rollers and over their whole length, without material being removed, the material being further conveyed, with rotation of the rollers, in the roller nip in the axial direction towards the outlet apertures, forced through such outlet apertures and at the same time divided up into granulates.

It has been found that the method according to the present invention produces substantially better results than the prior art method conventionally used. The resulting products are of much superior quality and at least equal to the known extruder granulate. Due to the reduced installation and operational costs, the granulates can be produced at a substantially more economic price.

Further objects of the invention reside in devices used for the performance of the method according to the invention, which have at least two (skin-forming) rotating curved surfaces for forming a skin of material being processed, characterized according to the invention in that at least one of the surfaces has at least one helical or similar profiling at one end of which the feed device for the material to be granulated is disposed and the granulate outlet apertures being disposed at the other end.

The rotating and cooperating curved surfaces which are to form a skin from the material to be processed into a granulate, are paired, in that either a concavely curved surface is disposed adjacent a convexly curved surface, or two convexly curved surfaces are disposed adjacent one another. Thus, as a practical matter the devices will include either a roller within a drum or two rollers, one beside the other, forming a roller nip therebetween. The helical profilings are disposed on the inner surface of a drum or on the outer surface of the rollers either on one of the surfaces or, if necessary, on both cooperating surfaces.

When there is only one helical profiling on a curved surface, during operation axial forces of varying value will occur which must be absorbed. To obviate this, two profilings of opposite hands (right and left hand) can be provided on a curved surface. In such case the material to be granulated is fed either in the center or at both ends of the roller, in dependence on the direction in which the profiling runs; the granulate outlet apertures are accordingly disposed either at the ends or in the center of the curved surfaces.

Often, and particularly when desired for adaptation to the material to be granulated, the roller nip, where the two curved rolling surfaces most closely approach each other, can conveniently be constructed not only parallel — i.e., symmetrically — but asymmetrically, for instance, in wedge shape, to enable the material being processed to be more satisfactorily treated in a well-defined manner. In this respect, it may also be convenient for the axes of the cooperating rolling surface devices, drum and roller or two rollers, not to extend parallel with one another, as will normally be the case, but to intersect one another at a predetermined adjustable angle. Another result of this is that the rollers need not absolutely have a cylindrical surface, since in various embodiments one or both can have a curved or conical or similar shape.

In dependence on the particular use in view, the most convenient forms of the apparatus can be developed having regard to the aforementioned criteria, to give the material to be granulated the optimum treatment as it passes through the apparatus, so that the granulate is obtained in the best possible form and consistency. Due to the various versatile shapes in which the granulating devices can be constructed, the processing of the materials to be granulated can be influenced, and more particularly, even within a particular embodiment of the apparatus the throughput and degree of compacting and homogenization can be adjusted within relatively wide limits, so that an apparatus of the kind specified can be used virtually universally for different materials.

Further novel features and other objects of this invention will become apparent from the following detailed description, discussion and the appended claims taken in conjunction with the accompanying drawings.

BRIEF DESCRIPTION OF DRAWINGS

Preferred structural embodiments of this invention are disclosed in the accompanying drawings, in which.

DESCRIPTION OF THE PREFERRED EMBODIMENTS

Figure 1:
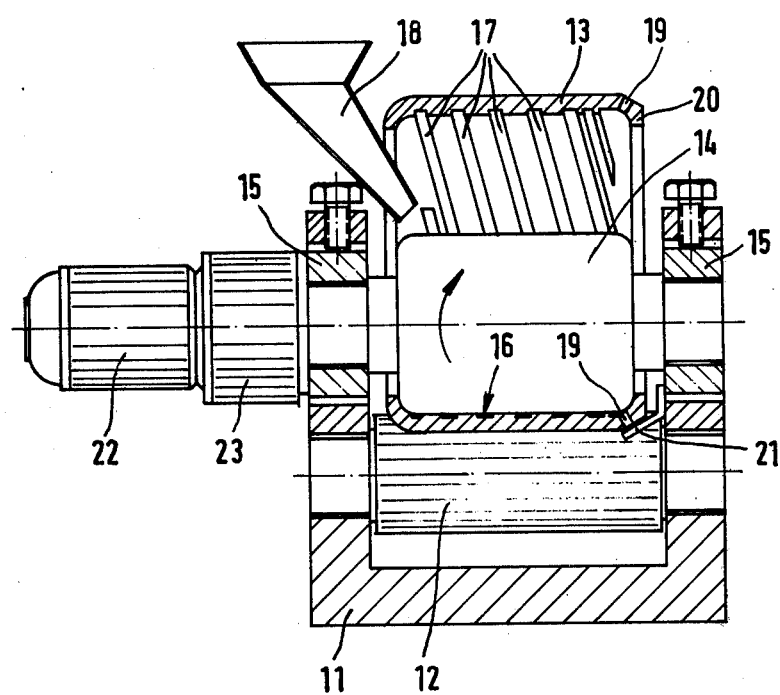
FIG. 1 is a vertical section through a granulating apparatus having a drum whose inner surface cooperates with the outer generated surface of the cylindrical roller.

Referring to FIG. 1, in the granulating apparatus illustrated, a frame 11 mounts two supporting rollers 12 (one shown), spaced to rotatably support a drum 13 lying freely on the rollers. Disposed in the drum 13 on a parallel axis is a cylindrical roller 14 mounted by vertically adjustable bearings 15 in the frame 11. The outer cylindrical surface of roller 14 cooperates with the inner cylindrical surface of the drum 13 to form a roller nip 16 or narrow space through which the material to be granulated is forced in order to form a skin. Disposed on the inner surface of the drum 13 is a helical profiling 17 extending from the side adjacent which a feed device 18 is disposed to the opposite side where the outlet apertures 19 for the granulate are provided in the drum. The outlet apertures 19 are disposed in the transitional zone between the cylindrical surface of drum 13 and the inwardly directed flange-like end periphery 20 thereof. Attached on the frame 11 closely adjacent the outside of the exit end of the drum is a blade 21 which, when drum 13 rotates, serves to cut off the material passing through the outlet apertures 19, so that the granulate occurs and is deposited in the proper sizes. The granulating apparatus and the cylindrical roller 14 are driven by an electric motor 22 and if desired via a variable speed gearing 23. The motor 22 and gearing 23 connect to and power drive the roller 14 the rotation of which, through friction against the inner surface of the drum either directly or via the material being processed, imparts rotation to the drum 13.

During the opperation of the granulating apparatus, the material to be granulated, supplied by the feed device 18, is fed at one end to the roller nip 16 between the drum 13 and the roller 14. The material forms as a skin which adheres to the inner wall of the drum 13. As it passes the roller nip, the material (or skin) is constantly displaced in an axial direction toward the outlet apertures 19, due to the action by the helical profiling 17 on the inner surface of the drum 13.

In the FIG. 1 embodiment, cylindrical roller 14 has a smooth surface. This roller surface can also have helical or the like profilings (lands or grooves); in dependence on their shape, i.e., if the helical lead varies, the axial movement of the material toward the outlet apertures 19 can be accelerated or decelerated.

Figure 2:
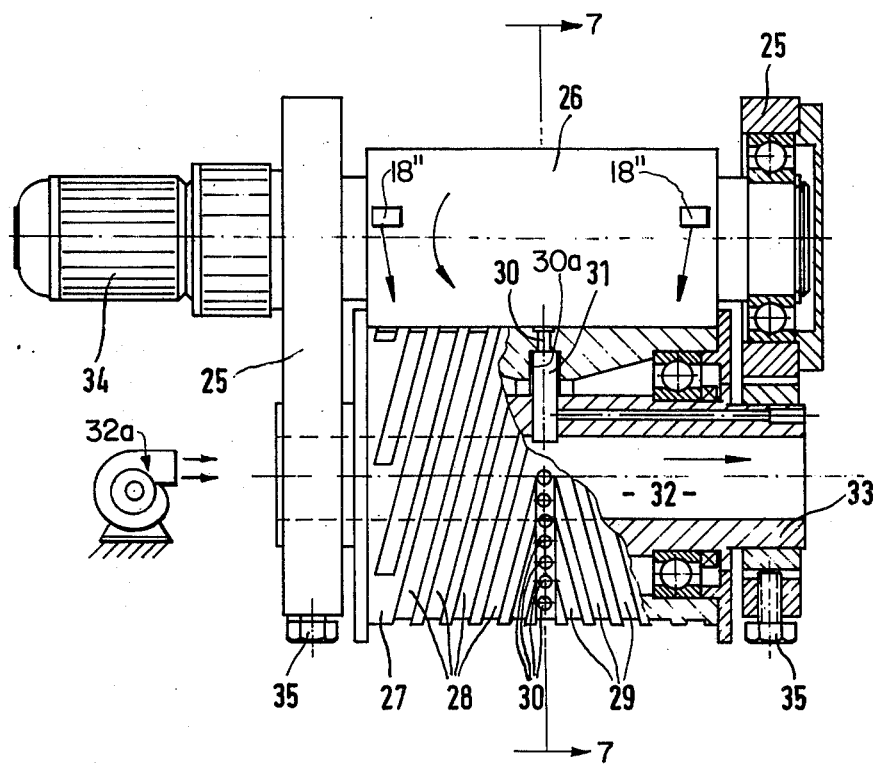
FIG. 2 is a view of a granulating apparatus which is similar to that illustrated in FIG. 1, but in which the axis of the drum is skewed at an angle with the axis of the interior roller.
Figure 7:
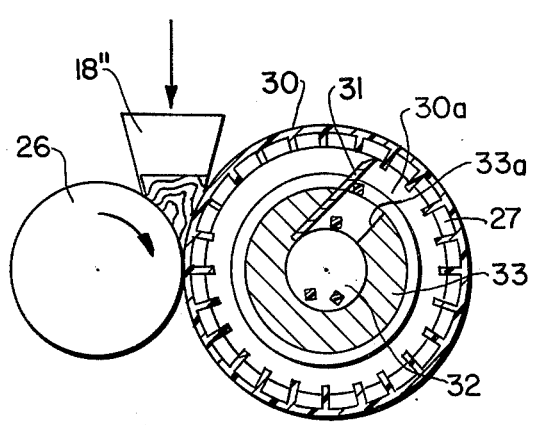
FIG. 7 (on the sheet with FIG. 2), is a section view taken on line 7—7 of FIG. 2.

In the granulating apparatus illustrated in FIG. 2, two cylindrical rollers 26, 27 are rotatably mounted in a frame 25, roller 27 having two helical profilings 28, 29 one right and one left hand, extending towards the central plane of the roller. A material feed assembly 18", similar to 18' in FIG. 4, will be used at each end of the roller nip. Disposed in the central plane of the hollow roller 27 are radial apertures 30 through which the material to be granulated, which will be moved from the outer ends of the roller to its center, is forced inwards into an annular groove 30a on the inside of the roller. A fixed blade 31, secured on a non rotatable hollow journal shaft 33, extends into the groove 30a and cuts the granulate off, and it drops into the inside 32 of hollow shaft 33 (through openings 33a, FIG. 7, in shaft 33) on which the hollow roller 27 is rotatably mounted. The granulate 19 can be removed from hollow shaft space 32, by suitable means, e.g., compressed air supply means 32a or suctional air. A drive motor 34 drives the roller 26 having a smooth surface, the roller 26, via frictional forces entraining the roller 27 in its rotation. The width of the roller nip between the two rollers 26, 27 can be adjusted by means of adjusting screws 35 which act on the retainers of the hollow shaft 33.

In this embodiment of granulating apparatus, axial forces are balanced and therefore no axial forces occur at the bearings of the rollers 26, 27. the profiling of the roller 27 can be made to progress in the opposite direction. In such case the device for feeding the material to be granulated will be disposed in the central plane of the rollers (as seen at 18' in FIG. 4) and granulate outlet apertures and knives similar to those shown at 30 and 31 will be provided at the two outer ends of one roller.

Figure 3:
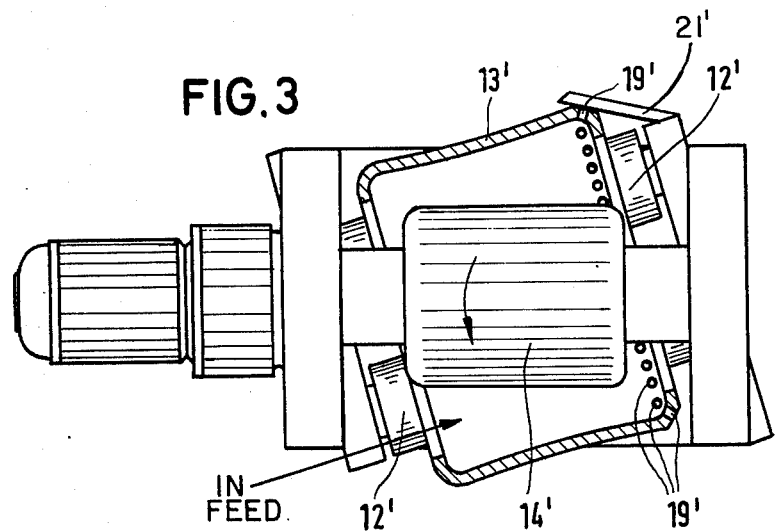
FIG. 3 is a sectioned plan view from above and shows a granulating apparatus which is similar to that illustrated in FIG. 1, but in which the axis of the drum is skewed at an angle with the axis of the interior roller.

The granulating apparatus illustrated in FIG. 3 (a top view) substantially corresponds to that illustrated in FIG. 1 in that a roller is disposed within a drum. However in the FIG. 3. embodiment the axes of the drum supporting rollers 12' are not parallel with the axes of the roller 14', but are skewed at a predetermined angle. As a result the axis of drum 13' is skewed in relation to the roller 14'. In this arrangement the inner surface of the drum is curved and ensures that the roller nip has a very specific shape, to enable the material for granulating to be processed in the required manner. If the drum surface is cylindrical the roller surface will be axially convex. With a granulating apparatus constructed in this way the helical profiling of the surfaces can be relatively small and low; sometimes, in dependence on the nature of the material for granulation, no profiling need be provided, since the inclined position of the drum exerts on the material in the roller nip an axial component which causes the material to move in the direction of outlet apertures 19'. The in feed, outlet and blades 21' of this embodiment will be similar to those described for FIG. 1. The in feed, shown schematically, can consist of a funnel which passes material into a front end of the hollow drum. Granules are cut by blade 21' and fall freely off the blade. They can be collected in any suitable means.

Figure 4:
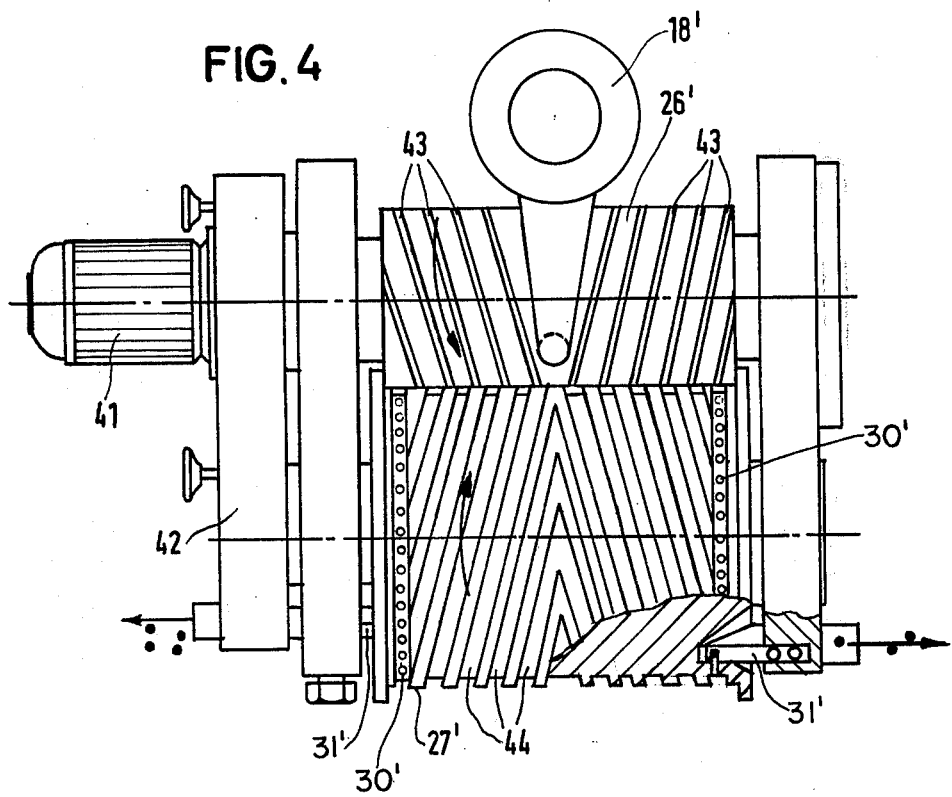
FIG. 4 is a view of a granulating apparatus having two rollers which form a nip and can be driven at different adjustable speeds.

The granulating apparatus illustrated in FIG. 4 has the feed assembly 18' at the center of the roller nip outlets 30' and blades 31' at each end of roller 27'. Otherwise, to a large extent the FIG. 4 apparatus corresponds to that illustrated in FIG. 2. However, in FIG. 4 the two rollers 26', 27' are coupled to one another via a transmission 42 driven by a motor 41, so that the two rollers can be driven in the same or opposite rotational direction and at predetermined speed. In this embodiment the two rollers 26', 27' have a surface profiling 43, 44 as shown.

Figure 6:
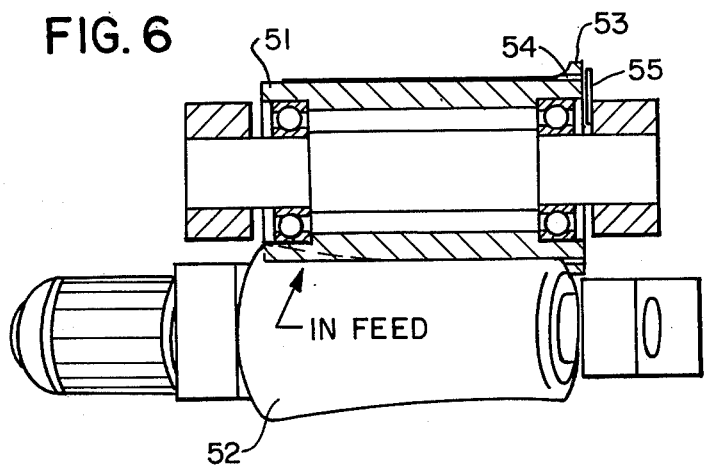
FIG. 6 is a partially sectioned top view of the embodiment shown in FIG. 5.
Figure 5:
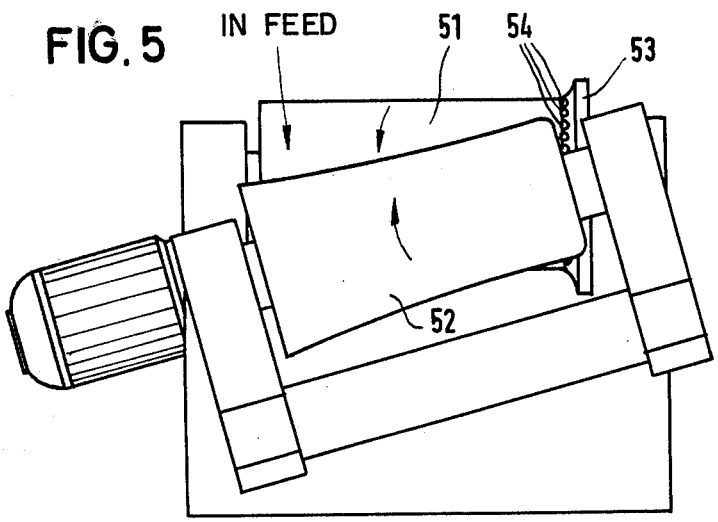
FIG. 5 shows diagrammatically two rollers one of which is tapered and whose axes are skewed at an angle to one another one of the rollers having a special curvature to accommodate the skewed disposition.

In the granulating apparatus illustrated in FIG. 5 the axes of two cooperating rollers 51, 52 forming a roller nip are skewed and one roller 52 is slightly tapered while the other roller 51 is cylindrical. With a suitable concave axial shaping of the surface of the tapered or conical roller 52, the result is a definite required shape for the roller nip between the two rollers 51, 52. One roller 51 has an exit end flange 53 with a contoured joinder fillet around which the granulate outlet apertures 54 are arranged and pass through the flange 53. The end contour of tapered roller 52 is contoured to closely match the contoured fillet of flange 53 so material progressing axially along the roller, when it reaches the fillet flange 53, will be pressed through apertures 54 and cut off by blade 55 (see FIG. 6).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for producing granulates from pulverulent, granular, doughy or similar material, such as plastics, comprising: rotatably mounted means having two closely adjacent but spaced apart rotatable curved surfaces, providing an elongate zone nip where the rotatable surfaces are approaching each other and each surface being rotatable about an axis; means on at least one of said rotatably mounted means providing at least one circumferential row of apertures through at least one of said rotatable surfaces adjacent said nip and spaced axially from said portion of said nip where material is fed, said rotatable surfaces being imperforate over a continuous extent of at least approximately one-half of their axial length extending from adjacent said row of apertures; drive means connected to said means with rotatable surfaces for imparting rotational drive thereto; means located adjacent said zone nip for continuously feeding material into one portion of the zone nip between the rotatable surfaces where said surfaces are imperforate; said surfaces at said zone providing periodic and repeated kneading action on the material causing it to be formed as a skin and conveyed in the axial direction and along the length of the adjacent imperforate portions of the rotating surfaces toward said at least one row of apertures; said surfaces, when rotating, providing a force on and causing kneaded material, when it has progressed to said row to pass through said apertures; and means located at the exit side of said apertures enabling granulating of the material extruding from said apertures.

2. Apparatus as defined in claim 1 wherein at least one of said two surfaces has at least one helical profiling, at one end of which the feeding means for the material to be granulated is disposed, and said material outlet apertures being disposed at the other end of said helical profiling.

3. Apparatus as defined in claim 1, wherein at least one of said rotatable curved surfaces is the surface of a roller.

4. Apparatus as defined in claim 3, wherein one of said rotatable curved surfaces is the surface of a hollow drum device.

5. Apparatus as defined in claim 4, wherein at least one of said two surfaces has at least one helical profiling, at one end of which the feeding means for the material to be granulated is disposed, and said material outlet apertures being disposed at the other end of said helical profiling, and said surfaces being imperforate from the inlet end of the profiling to said outlet end of the profiling.

6. Apparatus as defined in claim 5, wherein the surface with the helical profiling is the roller surface.

7. Apparatus as defined in claim 5, wherein the surface with the helical profiling is the inner surface of said drum.

8. Apparatus as defined in claim 2, wherein two profilings having opposite hands are disposed on at least one of the two surfaces.

9. Apparatus as defined in claim 8, wherein the material outlet apertures are disposed in one of said roller or said drum, at a location where the hands of the two profilings change.

10. Apparatus as defined in claim 8, wherein the material outlet apertures are disposed in one of said roller or said drum at both ends of said profiling, and said surfaces are imperforate between said apertures at the ends of said profiling.

11. Apparatus as defined in claim 3, wherein both surfaces are formed on rollers.

12. Apparatus as defined in claim 11, wherein the axes of said rollers are parallel.

13. Apparatus as defined in claim 11, wherein one of said rollers is tapered.

14. Apparatus as defined in claim 1, wherein means positively connect both of said means with rotatable surfaces to said drive means.

15. Apparatus as defined in claim 1, wherein said drive means drives one of said rotatable surfaces at a different speed from the other of said rotatable surfaces.

16. Apparatus as defined in claim 1 wherein adjustment means are provided to adjust the speed of rotation of said rotatable surfaces.

17. Apparatus as defined in claim 1, wherein the zone containing the nip is symmetrical, and means enable adjustment of the space of said nip.

18. Apparatus as defined, in claim 1, wherein the axes of the means with rotatable surfaces extend parallel with one another.

19. Apparatus as defined in claim 1, wherein the axes of said means with rotatable surfaces are skewed relative to each other.

20. Apparatus as defined in claim 1 wherein means are provided for adjusting the relative relationship between the axes of said two rotatable surfaces.

21. Apparatus for producing granulates from pulverulent, granular, doughy or similar material, such as plastics, comprising: rotatably mounted means having two closely adjacent but spaced apart rotatable curved surfaces, providing an elongate zone nip where the rotatable surfaces are approaching each other; at least one of said two surfaces having two helical profilings disposed thereon, said two profilings having opposite hands and being of different pitch; means for continuously feeding material into one portion of the nip of the rotatable surfaces at one end of the helical profilings; said surfaces at said zone providing periodic and repeated kneading action on the material causing it to be formed as a skin and conveyed in the axial direction and along the length of the adjacent portions of the rotating surfaces; said rotatably mounted means providing apertures, adjacent said nip at the other end of said helical profilings, spaced axially from said portion of said nip where material is fed, said rotatable surfaces providing a force on and causing kneaded material to pass through said apertures; and means located at the exit side of said apertures enabling granulating of the material extruding from said apertures.

22. Apparatus for producing granulates from pulverulent, granular, doughy or similar material, such as plastics, comprising: rotatably mounted means having two closely adjacent but spaced apart rotatable curved surfaces, providing an elongate zone nip where the rotatable surfaces are approaching each other; each of said two surfaces having helical profilings disposed thereon, said profiling on one surface having a different pitch from that on the other surface; means for continuously feeding material into one portion of the nip of the rotatable surfaces at one end of the helical profilings; said surfaces at said zone providing periodic and repeated kneading action on the material causing it to be formed as a skin and conveyed in the axial direction and along the length of the adjacent portions of the rotating surfaces; said rotatably mounted means providing apertures, adjacent said nip at the other end of said helical profilings, spaced axially from said portion of said nip where material is fed, said rotatable surfaces providing a force on and causing kneaded material to pass through said apertures; and means located at the exit side of said apertures enabling granulating of the material extruding from said apertures.

23. Apparatus for producing granulates from pulverulent, granular, doughy or similar material, such as plastics, comprising: rotatably mounted means including two rollers having closely adjacent but spaced apart rotatable curved surfaces providing an elongate zone nip where the rotatable surfaces are approaching each other; the axes of said rollers being skewed relative to each other; means for continuously feeding material into one portion of the nip of the rotatable surfaces; said surfaces at said zone providing periodic and repeated kneading action on the material causing it to be formed as a skin and conveyed in the axial direction and along the length of the adjacent portions of the rotating surfaces; said rotatably mounted means providing apertures adjacent said nip and spaced axially from said portion of said nip where material is fed, said rotatable surfaces providing a force on and causing kneaded material to pass through said apertures; and means located at the exit side of said apertures enabling granulating of the material extruding from said apertures.

24. Apparatus for producing granulates from pulverulent, granular, doughy or similar material, such as plastics, comprising: means having two closely adjacent but spaced apart rotatable curved surfaces, providing an elongate zone nip where the rotatable surfaces are approaching each other; said zone nip having a curved contour along its length; means for continuously feeding material into one portion of the nip of the rotatable surfaces; said surfaces at said zone providing periodic and repeated kneading action on the material causing it to be formed as a skin and conveyed in the axial direction and along the length of the adjacent portions of the rotating surfaces; said rotatably mounted means providing apertures adjacent said nip and spaced axially from said portion of said nip where material is fed, said rotatable surfaces providing a force on and causing kneaded material to pass through said apertures; and means located at the exit side of said apertures enabling granulating of the material extruding from said apertures.

* * * * *